US009924329B2

(12) United States Patent
Sun et al.

(10) Patent No.: US 9,924,329 B2
(45) Date of Patent: *Mar. 20, 2018

(54) METHOD FOR PROVIDING NOTIFICATIONS FOR MULTI-MEDIA BROADCAST/MULTICAST SERVICE

(71) Applicant: Samsung Electronics Co., Ltd., Gyeonggi-do (KR)

(72) Inventors: Chunying Sun, Beijing (CN); Xiaoqiang Li, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,854

(22) Filed: Oct. 13, 2015

(65) Prior Publication Data

US 2016/0037308 A1    Feb. 4, 2016

Related U.S. Application Data

(63) Continuation of application No. 11/658,951, filed as application No. PCT/KR2005/002482 on Jul. 29, 2005, now Pat. No. 9,191,222.

(30) Foreign Application Priority Data

Jul. 29, 2004  (CN) .......................... 2004 1 0071138

(51) Int. Cl.
*H04W 4/06*      (2009.01)
*H04W 72/00*     (2009.01)
(Continued)

(52) U.S. Cl.
CPC ............ *H04W 4/06* (2013.01); *H04L 12/189* (2013.01); *H04L 51/24* (2013.01); *H04W 68/00* (2013.01);
(Continued)

(58) Field of Classification Search
CPC ... H04W 72/005; H04L 12/189; H04L 12/587
See application file for complete search history.

(56) References Cited

U.S. PATENT DOCUMENTS 7,450,933 B2 * 11/2008 Kwak .................... H04H 60/91
                                                                   455/414.1
7,623,483 B2 * 11/2009 Yi .......................... H04L 12/189
                                                                       370/328
(Continued)

FOREIGN PATENT DOCUMENTS

EP    1 387 591    2/2004
EP    1 565 026    8/2005
(Continued)

OTHER PUBLICATIONS

3GPP, 3rd Generation Partnership Project; Technical Specification Group Radio Access Network; Introduction of the Multimedia Broadcast Multicast Service (MBMS) in the Radio Access Network (Stage-2); (Release 6), 3GPP TS 25.346 V2.6.0, Feb. 1, 2004.
(Continued)

*Primary Examiner* — Rhonda Murphy
(74) *Attorney, Agent, or Firm* — The Farrell Law Firm, P.C.

(57) ABSTRACT

A method for a multi-media broadcast/multicast service by a base station includes receiving, from a radio network controller (RNC), a command for updating an MBMS notification indicator, the command including notification indicator information and a connection frame number, determining whether a modification period is included in the command, and transmitting a notification indicator starting at a time based on the connection frame number for the modification period if the modification period is included in the command, wherein the notification indicator information is used to generate the notification indicator.

6 Claims, 10 Drawing Sheets

(51) Int. Cl.
*H04L 12/58* (2006.01)
*H04L 12/18* (2006.01)
*H04W 68/00* (2009.01)
*H04W 72/04* (2009.01)
*H04W 64/00* (2009.01)
*H04W 92/12* (2009.01)

(52) U.S. Cl.
CPC ..... *H04W 72/005* (2013.01); *H04W 72/0453* (2013.01); *H04L 51/38* (2013.01); *H04W 64/00* (2013.01); *H04W 92/12* (2013.01)

(56) References Cited

U.S. PATENT DOCUMENTS

| | | | |
|---|---|---|---|
| 8,311,563 B2* | 11/2012 | Lee | H04W 72/005 370/312 |
| 2004/0223513 A1 | 11/2004 | Meago | |
| 2004/0253959 A1 | 12/2004 | Hwang et al. | |
| 2005/0195852 A1* | 9/2005 | Vayanos | H04W 48/12 370/437 |
| 2006/0019641 A1 | 1/2006 | Vayanos et al. | |
| 2006/0252439 A1 | 11/2006 | Cal | |

FOREIGN PATENT DOCUMENTS

| | | |
|---|---|---|
| WO | WO 2004-102901 | 11/2004 |
| WO | WO 2004-107794 | 12/2004 |
| WO | WO 2006/104335 | 10/2006 |

OTHER PUBLICATIONS

Panasonic, "Impact of Frame Loss over Lub on Transmission of Notification Indication", 3GPP TSG-RAN WG3 #42, Tdoc R3-040745, May 10, 2004.
Samsung, "Physical Layer Issues for MBMS Notification", 3GPP TSG-RAN1 Adhoc, Tdoc R1-040018, Jan. 27, 2004.
3rd Generation Partnership Project; Technical Specification Group TSG RAN; Introduction of the Multimedia Broadcast Multicast Service (MBMS) in RAN; lub/lur/lu Aspects (Release 6), 3GPP TR R3.013 V0.2.0, May 2004.
Samsung, "Transmission of Notification Indication Over Lub", R3-040628, 3GPP TSG-RAN WG3 #41_BIS, Mar. 30-Apr. 1, 2004, 4 pages.
European Search Report dated Oct. 11, 2017 issued in counterpart application No. 17173497.3-1857, 10 pages.

* cited by examiner

METHOD FOR PROVIDING NOTIFICATIONS FOR MULTI-MEDIA BROADCAST/MULTICAST SERVICE

PRIORITY

This application is a Continuation Application of U.S. application Ser. No. 11/658,951, which was filed in the U.S. Patent and Trademark Office on Jun. 15, 2009, which is a National Phase Entry of PCT International Application No. PCT/KR2005/002482, which was filed on Jul. 29, 2005, and claims priority to Chinese Patent Application No. 200410071138.7, which was filed on Jul. 29, 2004, the contents of each of which are incorporated herein by reference.

BACKGROUND OF THE INVENTION

1. Field of the Invention

The present invention relates to Wideband Code Division Multiple Access of the 3G communication system, especially to a method for providing notifications for a Multi-media Broadcast/Multicast service.

2. Description of the Related Art

The Multimedia Broadcast/Multicast Service (hereinafter referred to as MBMS) is a new service under standardization by 3G Mobile Communication System Partnership Project (hereinafter referred to as 3GPP). The service provided in virtue of broadcast or multicast is an unidirectional point-to-multipoint (i.e. multimedia data sent from a single data source are transferred to multiple users through network transmission) service. The most remarkable feature of the service is that it can make use of radio resources and network resources efficiently. MBMS service is mainly used in wireless communication network system, e.g. Wideband Code-Division Multiple Access system, Global System of Mobile Communication, etc. MBMS service data transfer basically includes following several steps, i.e. data source transmission, middle network transmission, destination cell on-the-air transmission and user receiving. As shown in FIG. 1, Broadcast and Multicast Service Center 70 (hereinafter referred to as BM-SC) is the data source for MBMS data transmission; Gateway GPRS Supporting Node 60 (hereinafter referred to as GGSN) is used to connect GRPS network with external network, such as INTERNET; In MBMS service, the Gateway GPRS Supporting Node connects to the BM-SC and sends MBMS data to specific Service GPRS Supporting Node 50 (hereinafter referred to as SGSN); SGSN is used to perform access control on UE as well as mobility management, and sends MBMS data from GGSN to specific Radio Network Controller 30 (hereinafter referred to as RNC) at the same time; RNC is used to control a group of base stations like station 23 and 24 and sends multimedia data to specific base stations like station 23 and 24; a base station 23 establishes air common channel 11 for MBMS service of cell 21 under the control of the RNC; a base station 24 establishes air common channel 12 for MBMS service of cell 22 under the control of the RNC; Terminal User Equipment 10 (hereinafter referred to as UE) is a terminal equipment for MBMS data reception.

FIG. 4 shows a whole process from service announcement, joining of a user, service notification, establishment of radio bearer to leaving of the user finally in MBMS service.

401 Subscription: Establish a connection between a user and a service provider, and authorize the user to receive a relevant MBMS service.

402 Service Announcement: Notify a user of services that will be provided. For example, the system will rebroadcast a football match in Beijing at 7:00 p.m.

403 Joining: Refers to that the user joins a group, i.e. the user informs the network that he or she is willing to receive this multicast service.

404 MBMS Session Start: Refers to establish a network resource for MBMS data transfer.

405 MBMS Notification: Notify the user of MBMS data transfer that will be performed right away.

406 Data transmission: Refers to the process of transferring MBMS service data to the user.

407 MBMS Session Stop: Refers to release the network resource after the MBMS service data transfer process is completed.

408 leaving: Oppositely to 403 joining, which indicates that the user is leaving the group, i.e. the user doesn't want to receive the data of a certain service any more.

Because step 405 is the content that the present invention should emphasize, it will be introduced in detail in the following. FIG. 2 is referred for more information. There are many conditions to activate the RNC to perform MBMS notifications, for instance, to inform the UE that the MBMS session starts, to re-count the number of users, to inform the UE that the session is completed, etc. Two steps are applied to carry out the MBMS notification: first, an indication bit is set for each corresponding MBMS service which needs to send notifications in a cell's Multi-media Broadcast/Multicast Indication Channel (hereinafter referred to as MICH) (202), and the UE receives the MICH via the air interface (203); next, the corresponding RRC messages are transferred through the Multi-media Broadcast/Multicast Control Channel (hereinafter referred to as MCCH), indicating the actions of the UE (204). The structure of the MICH is shown in FIG. 5. In the MICH, 300 bits are available in use, and in general, only the fore 288 bits are used, leaving alone the rest 12 bits. The actual number of MICH bits used in the service is not involved in the present invention. Here, let N be the number of available bits in an MICH frame, these N bits are divided into Np groups with each group indicating only one MBMS service group within a frame, and the number of bits needed for a group is just N/Np.

A time when the UE tunes in the MICH corresponds to its own user ID, and the tuning in locations each time it wakes up are different to every frame. In the MBMS, in order to carry out the MBMS notification for all UEs that have subscribed this service, all UEs should be enabled to detect that the notification indication bit NI of the MICH has been set to true for the subscribed service, thus repeating to send said service notification within a certain period, which is defined as the modification period, as shown in FIG. 3.

Since the MICH has limitation in information transfer, it exists such moment that different services map to the same location of the MICH. To reduce this probability, a method for spreading NI is proposed in the WCDMA system so that each service's corresponding location NI in a frame is made different from any others with a certain algorithm. In this way, the probability that several services correspond to the same location NI can be reduced so as to avoid that the notification NI received by the UE is not the very one for the service that the UE has subscribed.

According to this method, the data sent to the Node 13 in each frame is needed to be calculated by the RNC and transferred to the Node B through FP. Usually, if indicator of a certain service is true, then the specific N/Np bits in the MICH must be set as true within the whole modification period. This means that the RNC should send data to the Node B in every frame, thus, the traffic through an interface Iub becomes comparatively larger and higher requirements are put forward to the needed transmission equipments. If this condition could be improved, not only the traffic through the interface Iub can be reduced, but also the operating efficiency of the Node B can be enhanced. By the existing technique, the contents to be transferred through the MICH are well calculated by the RNC according to some algorithm based on mapping relationship, and generally, the RNC transfers the Np bits to the Node B through the frame protocol FP in the interface lub, with each bit indicating whether the corresponding service is true or false. Then, the Node B maps each bit to the N/Np bits of the MICH and transmits it to the UE via the air interface.

SUMMARY OF THE INVENTION

The present invention has been made to address the above-mentioned problems and disadvantages, and to provide at least the advantages described below. Accordingly, an aspect of the present invention is to provide a method for providing notifications for multi-media broadcast/multicast.

According to an aspect of the present invention, a method for a multi-media broadcast/multicast service by a base station includes receiving, from a radio network controller (RNC), a command for updating an MBMS notification indicator, the command including notification indicator information and a connection frame number, determining whether a modification period is included in the command, and transmitting a notification indicator starting at a time based on the connection frame number for the modification period if the modification period is included in the command, wherein the notification indicator information is used to generate the notification indicator.

According to another aspect of the present invention, an apparatus for an MBMS by a base station includes a receiver for receiving, from an RNC, a command for updating an MBMS notification indicator, the command including notification indicator information and a connection frame number, a controller for determining whether a modification period is included in the command, and a transmitter for transmitting a notification indicator starting at a time based on the connection frame number for the modification period if the modification period is included in the command, wherein the notification indicator information is used to generate the notification indicator.

DETAILED DESCRIPTION OF THE PREFERRED EMBODIMENTS

Figure 1:
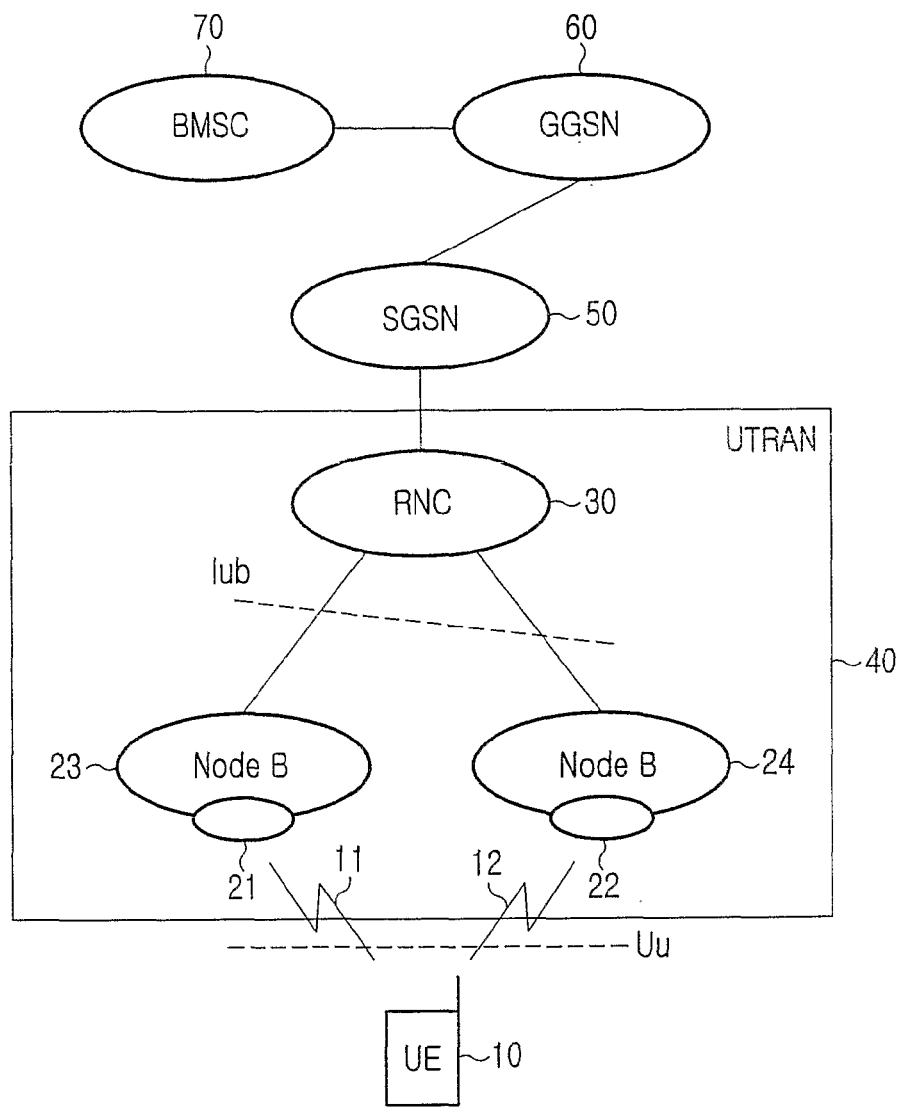
FIG. 1 shows a logic device diagram of MBMS.
Figure 2:
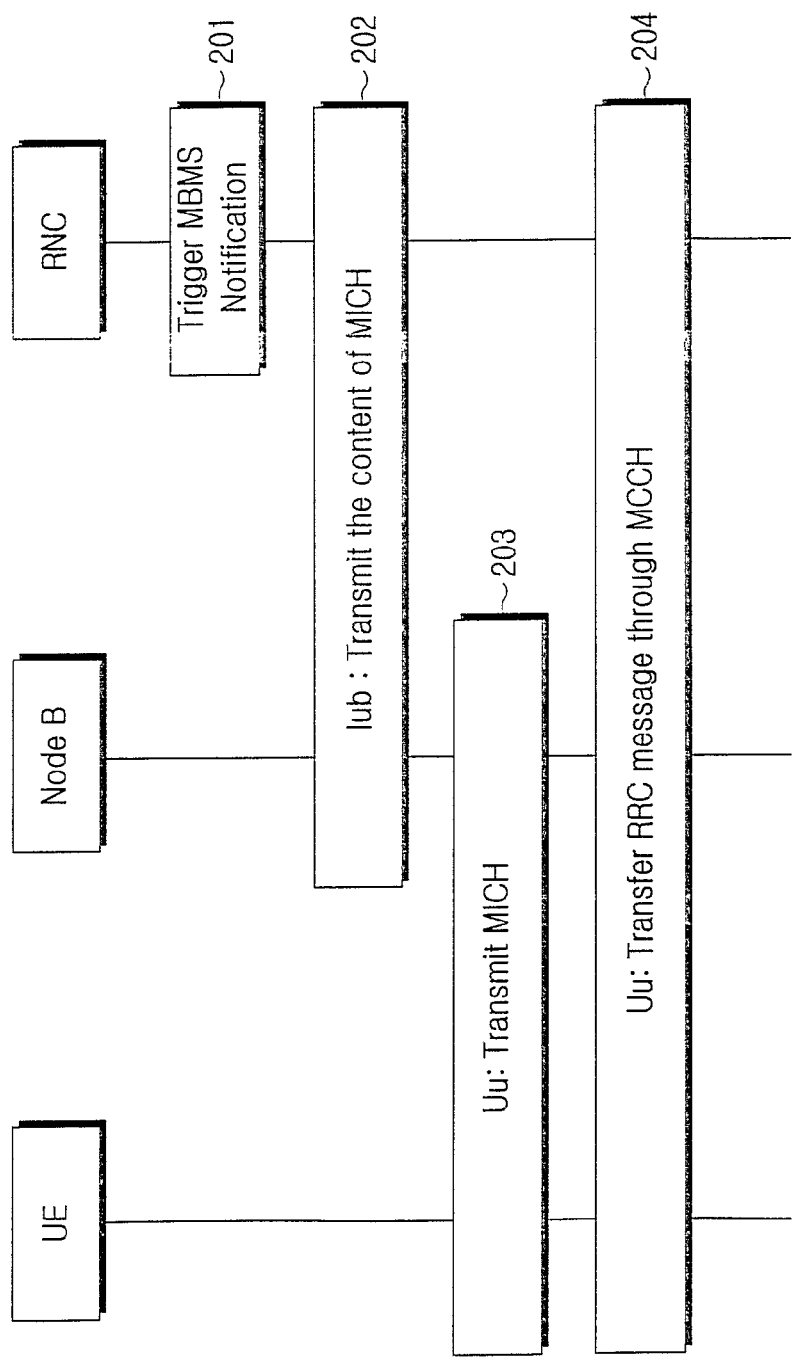
FIG. 2 is a flowchart of a MBMS notification.
Figure 3:
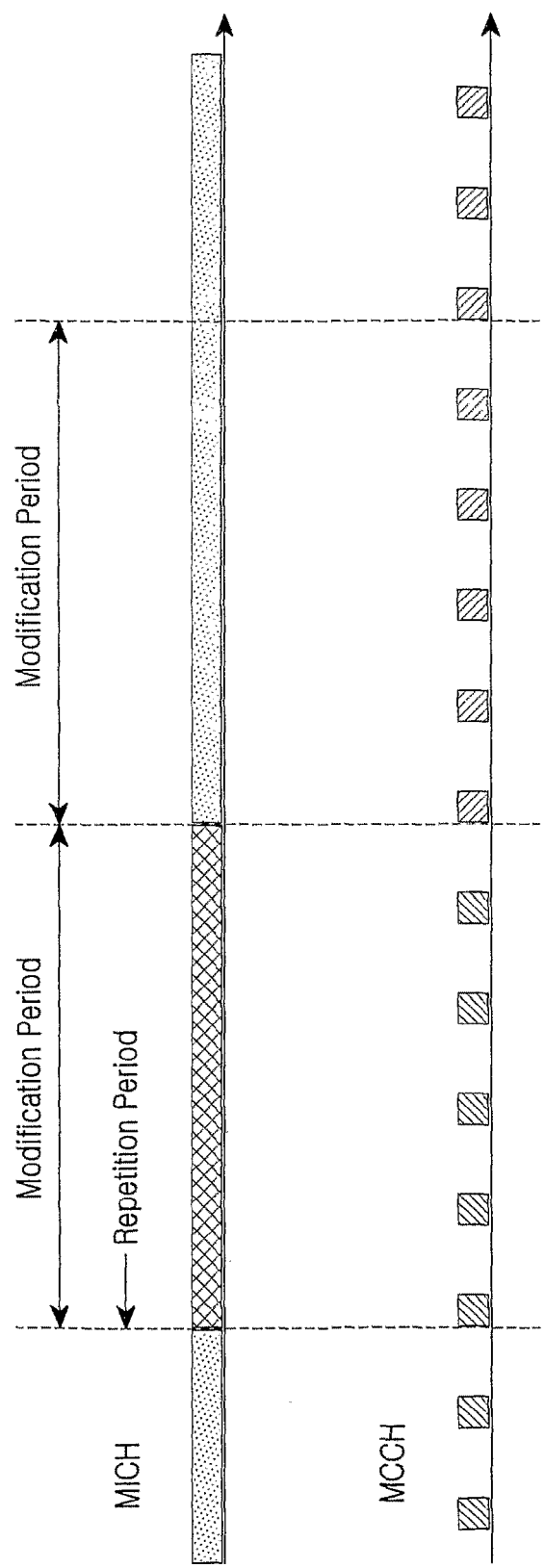
FIG. 3 shows a transmission period of MICH.
Figure 4:
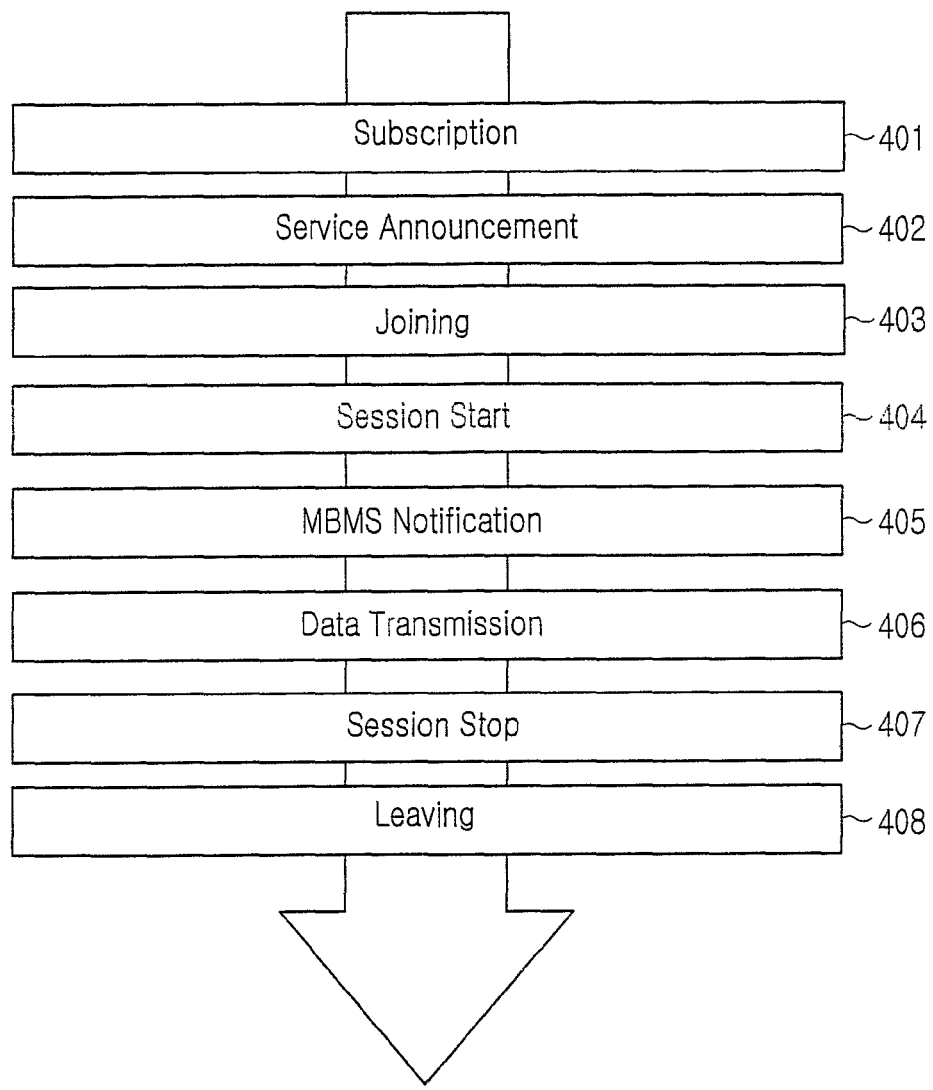
FIG. 4 is a flowchart of MBMS multicast service.
Figure 5:
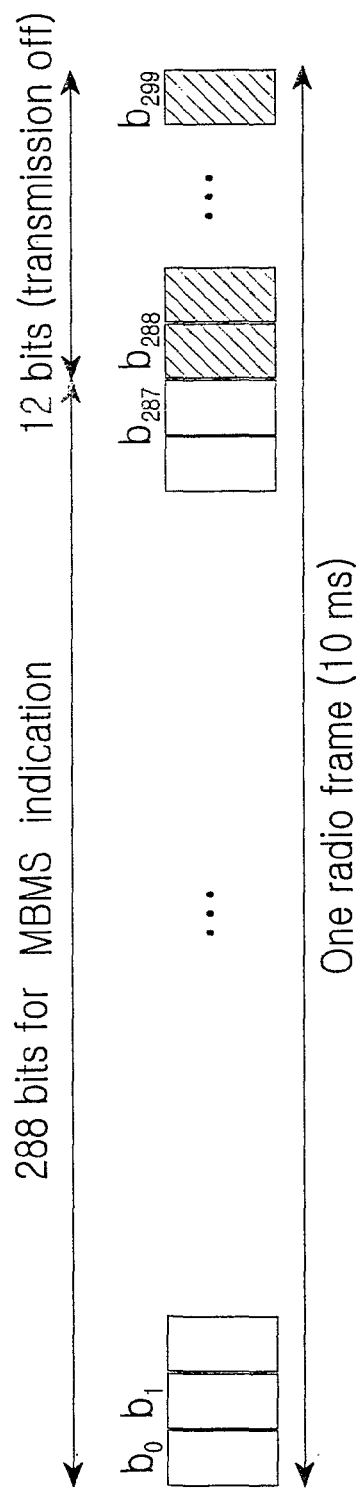
FIG. 5 shows a structure of MICH.
Figure 6:
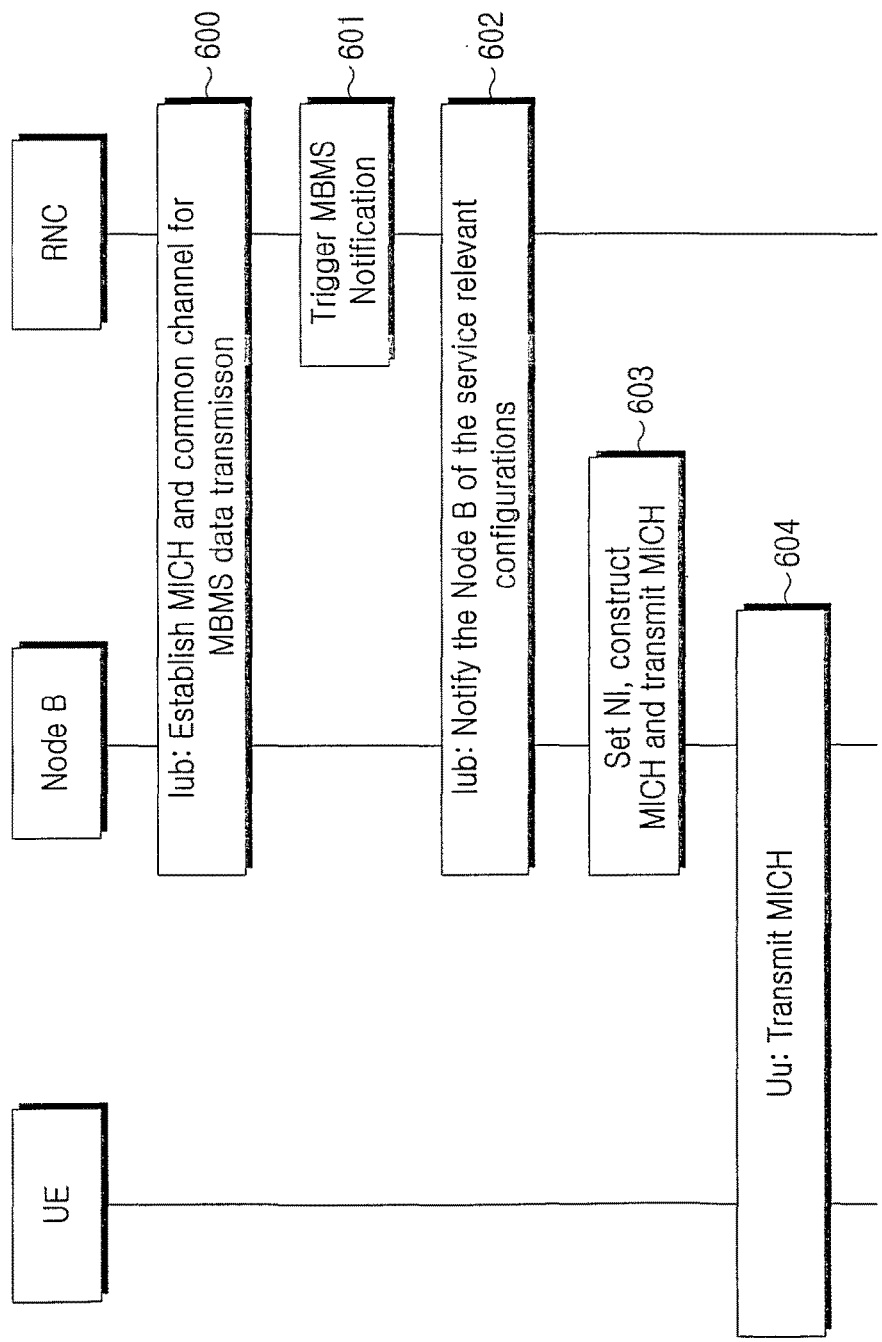
FIG. 6 shows a flowchart according to the present invention.

FIG. 6 shows the basic content of the present invention. When the RNC needs to provide MBMS service in some cells, it should establish and configure the MICH channel in the cells, and establish and configure the common channel for service transmission, which is illustrated in 600. When the RNC needs to carry out the MBMS notification for a certain MBMS service or several MBMS services (601), it sends the information such as parameters like service ID relative to these services to the Node B (602). With the information received from the RNC, the Node B calculates the location NI of each service in a certain frame, then generates an integrated MICH (603) and transfers it to the UE (604).

In order to calculate the location NI of a certain service group in a certain frame, the Node B needs such information as the service ID, Np, modification period, start time, terminative time, transmission power and so on.

Figure 7:
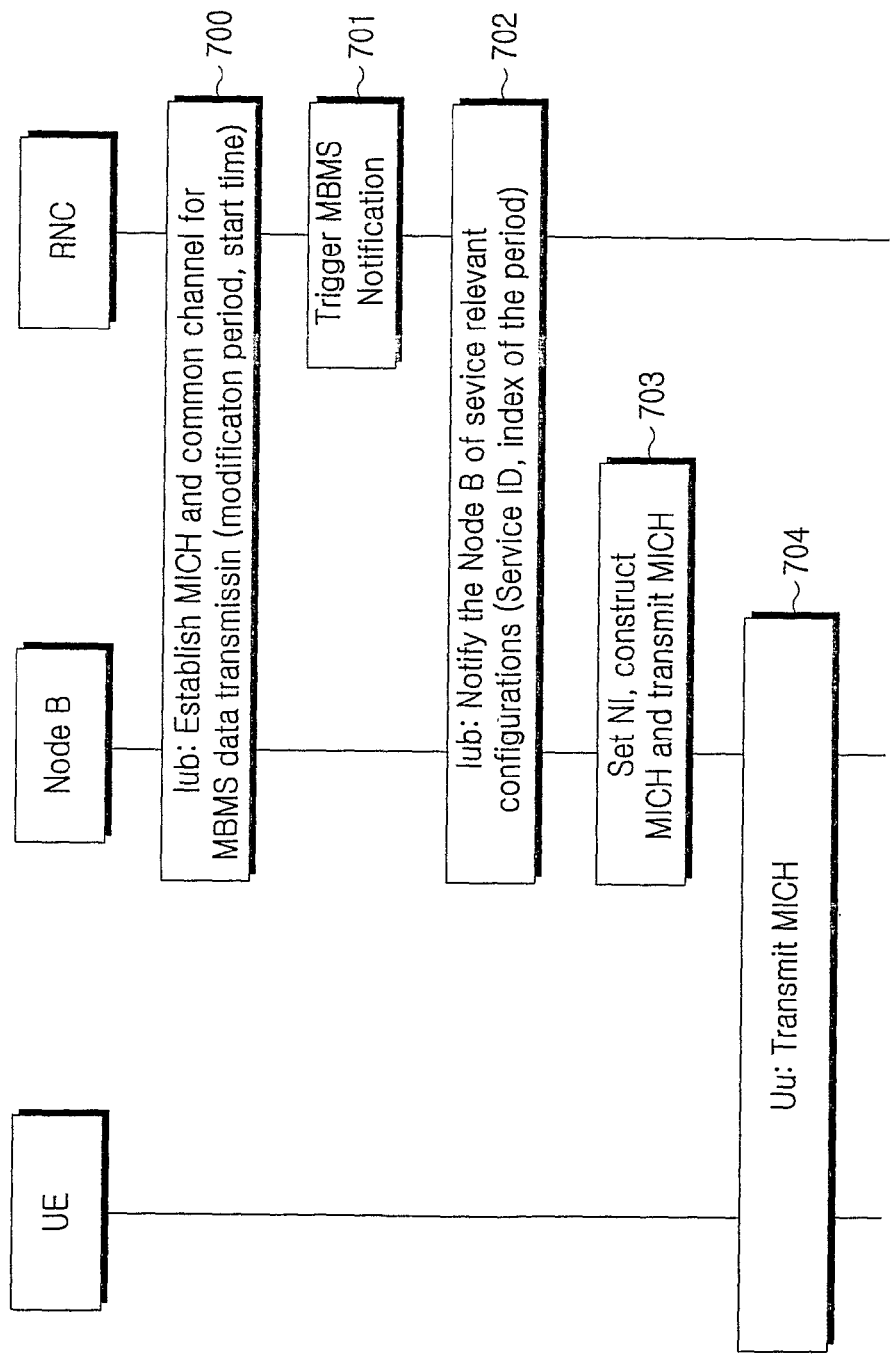
FIG. 7 shows an embodiment of the present invention.

The first embodiment of the present invention is illustrated in FIG. 7.

When the RNC decides to provide MBMS service to some cells, it needs to establish the MICH and the common channel for service transmission in these cells (700). There is only one MICH in each cell, but several common channels can be established in one cell for MBMS service transmission according to the different types of services. Some common channels can only support one kind of service, but some ones can support many kinds of services. The RNC sets the modification period and the start time at the time it configures the MICH. The modification period means that the content of the information transmitted through the MICH or the content of the control information transmitted through MCCH is just the same within the period for some MBMS service. For the MICH, the NI corresponding to the service must be set as true in all frames within one modification period. The start time indicates the time when the modification period starts. In general, the common channel is denoted by the cell's system frame number SFN which repeats from 0 to 4095. The value of start time ranges from 0 to (modification period−1). The algorithm for calculating a new start time for MICH is that the start time+(modification period)×N, wherein, N denotes the total number of modifications within a cycle period of SFN.

When the MBMS service starts or it is needed to carry out the MBMS notification (701), the RNC informs the Node B of the service ID and the start time of the MBMS service that needs to be notified (702). In this case, if the RNC needs to carry out the MBMS notifications for several services simultaneously, it can send the service IDs corresponding to the several services to the Node B at the same time. The start time indicates to the time when the Node B should transmit the MICH, and it can be denoted by an absolute value of SFN, an index of the modification period (i.e., N mentioned above), or a Connection Frame Number. If the start time is not presented in step 700 by the RNC, it can be presented here. Then, the Node B sets the NI locations in each frame for each service with the modification period, the start time and the service ID (703), and combines them in one MICH frame. Next, the Node B transmits the MICH to the UE through the air interface (704). If neither the modification period nor the start time is presented in step 700 by the RNC, the RNC may inform the Node B of the service ID, the start time and terminative time of the MBMS service that needs to be notified in 702. Both the start time and the terminative time can be denoted by SFN, indicating the start frame number and terminative frame number of the notified MBMS respectively.

Following three methods can be adopted by the RNC to send the relevant MBMS information to the Node B in 702: by means of a NBAP signaling of a control plane, a frame protocol FP of a user plane or the control frame of the user plane.

Figure 8:
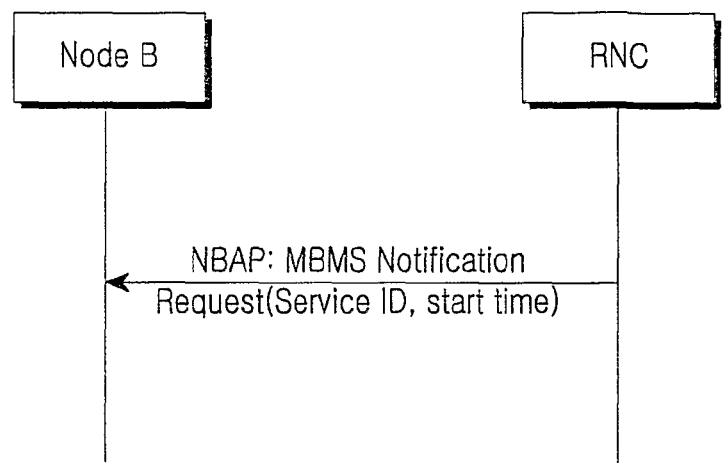
FIG. 8 illustrates the first aspect of the embodiment of the present invention.

The first aspect of this embodiment is illustrated in FIG. 8.

The RNC sends the MBMS notification request message to the Node B through the NBAP signaling, which contains a MBMS service list, the start time and an initial time, or contains the MBMS service list, the start time and the terminative time. The detailed explanations of these four parameters are shown in 702.

Figure 9:
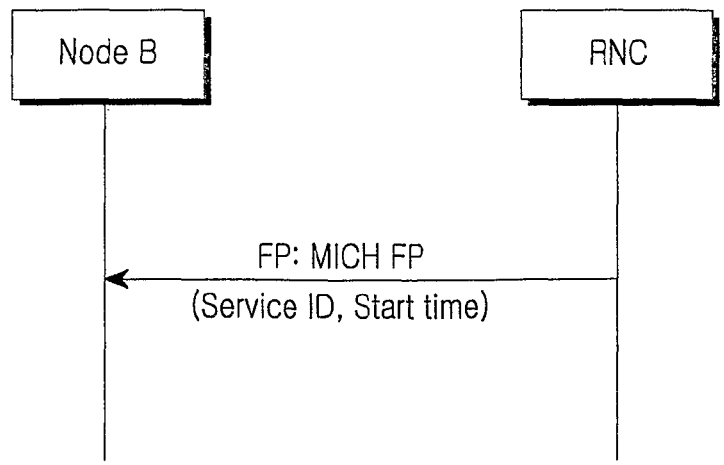
FIG. 9 illustrates the second aspect of the embodiment of the present invention.

The second aspect of this embodiment is illustrated in FIG. 9.

The RNC sends the MBMS service notification request message to the Node B through the FP of the user plane, which contains the MBMS service list, the start time and the initial time, or contains the MBMS service list, the start time and the terminative time. The detailed explanations of these four parameters are shown in 702. The FP should be transmitted through the transmission channel of MICH and includes either the information of several services or only one service ID. In the latter case, if it is necessary to send the MBMS notification for several services simultaneously, one FP is needed to be transmitted for each service.

Figure 10:
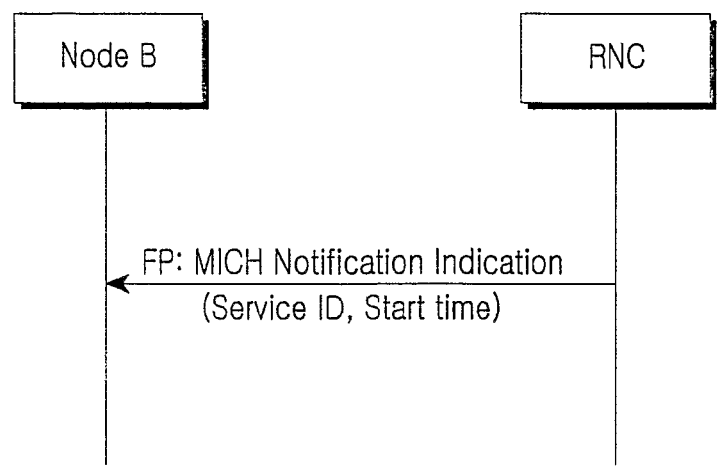
FIG. 10 illustrates the third aspect of the embodiment of the present invention.

The third aspect of this embodiment is illustrated in FIG. 10.

The RNC sends the MICH notification indication message to the Node B through the control frame of the user plane, which contains the MBMS service list, the start time and the initial time, or contains the MBMS service list, the start time and the terminative time. The detailed explanations of these four parameters are shown in 702. This control frame should be transmitted through the common channel that is used to transmit relevant services. If the common channel transmits only one service, the control frame includes only one MBMS service ID, otherwise, it possibly includes several MBMS service IDs. Of course, one control frame can be transmitted for each service, thus the control frame comprises only one MBMS service ID.

Figure 11:
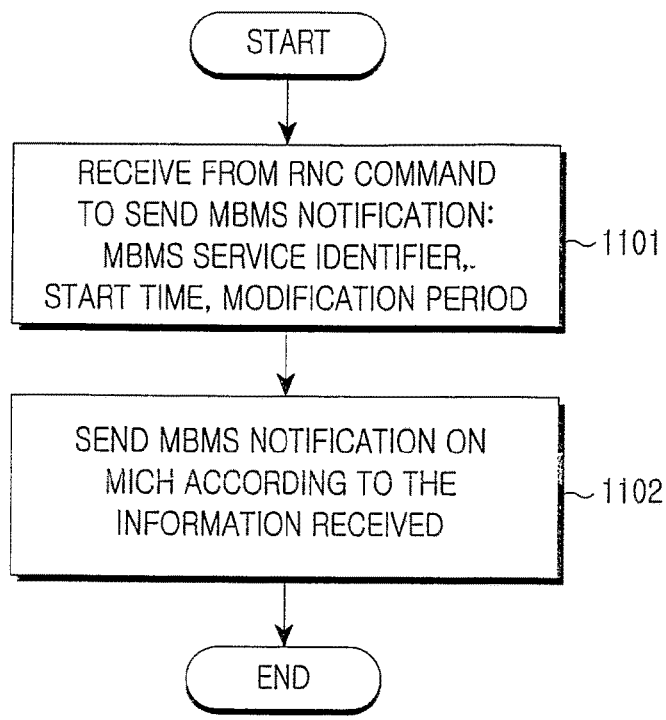
FIG. 11 illustrates the behavior of Node B of the present invention.

The behaviour of the Node B is illustrated in FIG. 11.

1101 Node B receives the command from the RNC to send MBMS Notification. This command can be via NBAP control signaling, or messages via FP in user plane, or control frame via user plane. This command comprises the MBMS service identifier to notify, start time (SFN or CFN), modification period. Service identifier could be any information related to a specific MBMS service. The modification period denotes the number of frames to repeat MBMS notification on MICH. 1102 Node B calculates the location of NI in every specific frame and the notification frames and then transmit NI over MICH.

Figure 12:
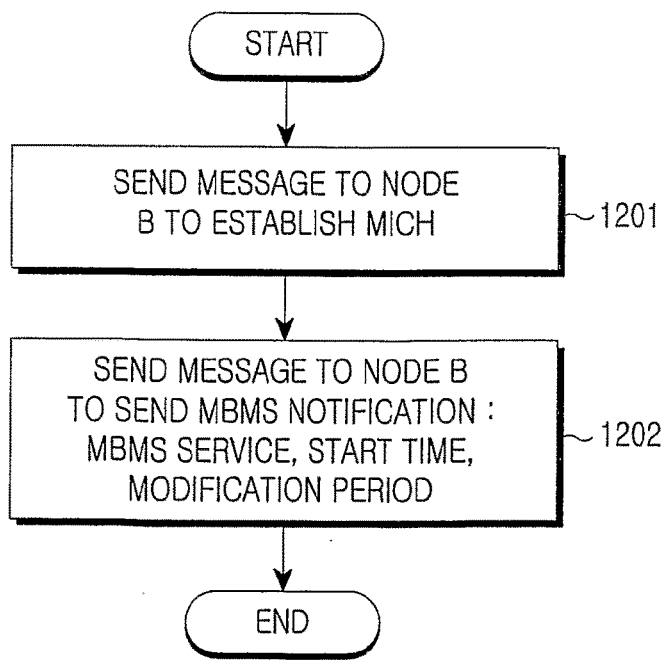
FIG. 12 illustrates the behavior of RNC of the present invention.

The behaviour of the RNC is illustrated in FIG. 12.

1201 RNC establishes MICH in a cell by sending NBAP message to the Node B. 1202 RNC sends command to Node B to transmit the MBMS notification in the cell. This command can be via NBAP control signaling, or messages via FP in user plane, or control frame in user plane. This command comprises the MBMS service identifier to notify, start time (SFN or CFN), modification period. Service identifier could be any information related to a specific MBMS service. The modification period denotes the number of frames to repeat MBMS notification on MICH.

What is claimed is:

1. A method by a base station, the method comprising:
receiving, from a radio network controller (RNC), a command including notification indicator information and a connection frame number;
identifying that a modification period is included in the command; and
transmitting a notification indicator on a multi-media broadcast/multicast service (MBMS) notification indication channel starting at a MBMS notification indicator channel connection frame number equal to the connection frame number,
wherein the notification indicator information is used to generate the notification indicator.

2. The method of claim 1, wherein the notification indicator is transmitted on the MBMS notification indication channel for a duration equal to the modification period.

3. The method of claim 1, wherein the command further comprises a common channel identifier.

4. A base station, comprising:
a transceiver; and
a controller configured to:
receive, via the transceiver from a radio network controller (RNC), a command including notification indicator information and a connection frame number,
identify that a modification period is included in the command, and
transmit, via the transceiver, a notification indicator on a multi-media broadcast/multicast service (MBMS) notification indication channel starting at a MBMS notification indicator channel connection frame number equal to the connection frame number,
wherein the notification indicator information is used to generate the notification indicator.

5. The base station of claim 4, wherein the notification indicator is transmitted on the MBMS notification indication channel for a duration equal to the modification period.

6. The base station of claim 4, wherein the command further comprises a common channel identifier.

* * * * *